M. J. JOHNSON.
ELECTRICAL MEASURING INSTRUMENT.
APPLICATION FILED JAN. 24, 1918.
1,288,019.
Patented Dec. 17, 1918.
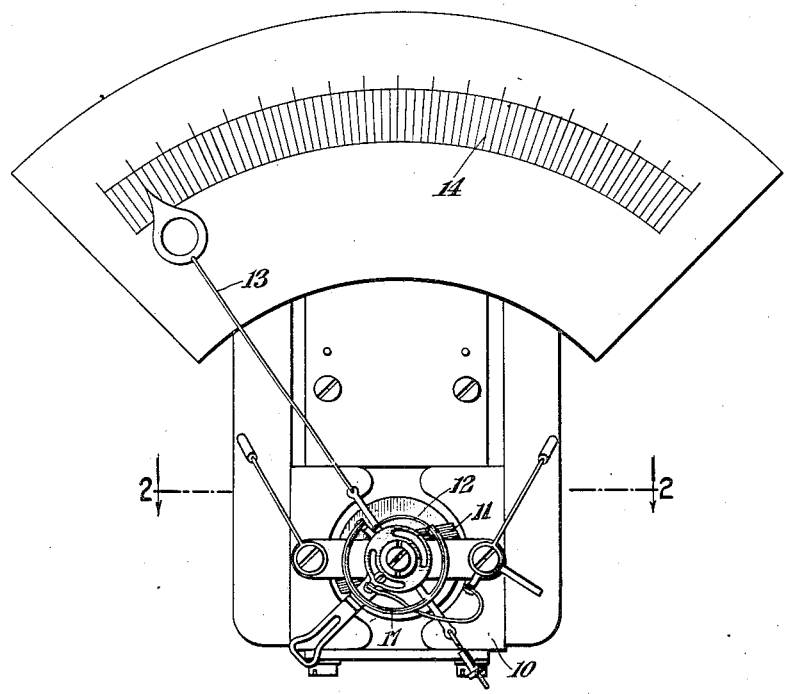
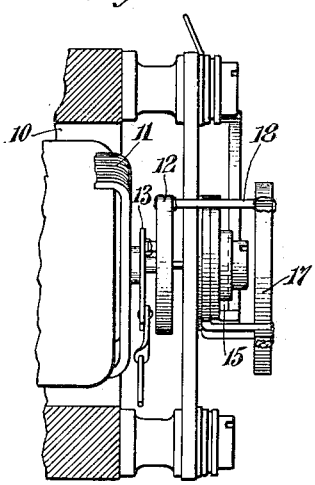
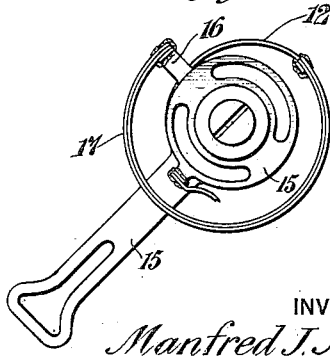
INVENTOR
Manfred J. Johnson
BY
ATTORNEY

UNITED STATES PATENT OFFICE.

MANFRED J. JOHNSON, OF NAUGATUCK, CONNECTICUT, ASSIGNOR TO THE BRISTOL COMPANY, OF WATERBURY, CONNECTICUT, A CORPORATION OF CONNECTICUT.

ELECTRICAL MEASURING INSTRUMENT.

1,288,019.   Specification of Letters Patent.   Patented Dec. 17, 1918.

Application filed January 24, 1918. Serial No. 213,480.

*To all whom it may concern:*

Be it known that I, MANFRED J. JOHNSON, a citizen of the United States, and a resident of Naugatuck, in the county of New Haven and State of Connecticut, have invented certain new and useful Improvements in Electrical Measuring Instruments, of which the following is a specification.

This invention relates to improvements in measuring instruments, more particularly electrical measuring instruments, such as galvanometers and like apparatus, for measuring the amperage or the voltage of an electric current. It has for its object to provide means for compensating the error in the indications of the instrument produced by variations of temperature of the surrounding atmosphere. The invention is restricted more particularly to instruments wherein the electricity is introduced to the moving coil of the instrument through coiled springs.

In carrying out the invention, the compensating means are introduced as an integral and active part of one or both of the said coiled springs.

The nature of the invention will be best understood when described in connection with the accompanying drawings, in which—

Figure 1 is a front elevation of a standard Weston ammeter of the D'Arsonval type.

Figs. 2 and 3 are enlarged detail views, Fig. 2 being a fragmentary side view, and Fig. 3 a fragmentary front view.

Similar characters of reference designate corresponding parts throughout the several views.

Referring to the drawings, 10 designates the pole pieces of a permanent magnet, between which is mounted to oscillate in well-known manner a pivoted armature or moving coil 11 to which electricity is led by a forward and rearward coiled flat spring 12— the forward one only being indicated in the drawings. A measuring arm 13 extends outwardly from said armature 11, operating over a suitably graduated dial 14, all of which is well understood and forms no part of the present invention. Heretofore, various means have been proposed to mechanically set the measuring arm 13 to the proper position to correspond with the surrounding atmospheric temperature as well as to correct for changes due to other causes. Such means, as for example the rotatably mounted arm 15 shown herein, have been employed to manually move said forward coiled spring 12, the outer end of the said spring for this purpose being attached directly to a projection 16 of the supporting and rotatable arm 15.

In accordance with the present invention, however, means are provided to automatically effect a compensating motion of the measuring arm 13 through said coils, said means being made as an integral and active part of one or both of the moving coils 12. To this end, the outer end, preferably of the said forward coils, instead of being attached to the extension 16 of the adjusting arm 15, as heretofore, is attached to one end of a differential strip or coil 17, or rather to an intermediate pin or rod 18 extending outwardly therefrom. The other end of said coiled differential strip 17 is secured to the extension 16 of the arm 15, and may consist of a fraction of a turn or of a plurality of turns, according to the extent of compensation required, the particular length and number of turns thereof being determined by trial. For satisfactory results, it has been found that a strip composed of brass and steel may be employed, or of brass and some metal of zero coefficient of expansion, as that known commercially as "invar," which is an alloy of steel with 36% of nickel. The action of said differential strip, when thus included with the current introducing coiled spring or springs, is to draw over the outer end of coiled spring 12 with a decrease in temperature, and move same back with an increase in temperature. In this manner, the instrument may be compensated for variations in temperature of the surrounding atmosphere, and is particularly adapted for affording additional compensation to take care of the variations of the electromotive force of thermo-electric couples, due to changes of temperature at the cold end thereof, it being understood that the cold end of the couple is then to be located within the instrument or in proximity thereto. To adjust for any set of the instrument or change due to causes other than temperature variations, the arm 15 may be manually moved to properly adjust the measuring arm 13, as heretofore.

I claim:

1. In an electrical measuring instrument of the D'Arsonval type, and embodying a conducting moving coil for the measuring arm thereof, resilient means for introducing electricity thereto, and a supporting member, the combination with such resilient means of a temperature compensating member forming an integral and active part thereof.

2. In an electrical measuring instrument of the D'Arsonval type, and embodying a conducting moving coil for the measuring arm thereof, resilient means for introducing electricity thereto, and a supporting member, the combination with such resilient means of a temperature compensating member having one end connected to an end of said resilient means and the other to the supporting member.

3. In an electrical measuring instrument of the D'Arsonval type, and embodying a conducting moving coil for the measuring arm thereof, resilient means for introducing electricity thereto, and a supporting member, the combination with such resilient means of a temperature compensating member having one end connected to an end of said resilient means and the other to the supporting member, and means to adjust said supporting member.

4. In an electrical measuring instrument of the D'Arsonval type, and embodying a conducting moving coil for the measuring arm thereof, resilient means for introducing electricity thereto, and a supporting member, the combination with such resilient means of temperature compensating means comprising a differential coil portion, one end thereof being connected to an end of said resilient means, and the other to the supporting member.

5. In an electrical measuring instrument of the D'Arsonval type, and embodying a conducting moving coil for the measuring arm thereof, resilient means for introducing electricity thereto, and a supporting member, the combination with such resilient member, the combination with such resilient means of temperature compensating means comprising a differential coil portion, consisting of a strip of brass and a strip of nickel-steel alloy, one end thereof being connected to an end of said resilient means, and the other to the supporting member.

6. In an electrical measuring instrument of the D'Arsonval type, and embodying a conducting moving coil for the measuring arm thereof, a coiled spring member for introducing electricity thereto, and a supporting member, the combination with the said spring member of a coiled differential conducting strip, having one end connected to the outer end of said spring member and the other secured to the supporting member.

7. In an electrical measuring instrument of the D'Arsonval type, and embodying a conducting moving coil for the measuring arm thereof, a coiled spring member for introducing electricity thereto, and a rotatably mounted supporting member having an extension for manual operation, the combination with the said spring member of a coiled differential conducting strip, having one end connected to the outer end of said spring member and the other secured to the said supporting member.

Signed at Waterbury, in the county of New Haven and State of Connecticut, this 19th day of January, A. D. 1918.

MANFRED J. JOHNSON.

Witnesses:
WM. H. BRISTOL,
S. R. BRISTOL.